US009066113B1

(12) United States Patent
Ching et al.

(10) Patent No.: US 9,066,113 B1
(45) Date of Patent: Jun. 23, 2015

(54) METHOD FOR ENSURING RELIABLE PLAYOUT IN A DMD SYSTEM

(75) Inventors: Jennie Ching, Northridge, CA (US); Eric Hsiao, San Marino, CA (US); Peter S. Lee, Calabasas, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 798 days.

(21) Appl. No.: 09/523,827

(22) Filed: Mar. 13, 2000

Related U.S. Application Data

(63) Continuation of application No. 09/420,802, filed on Oct. 19, 1999, now abandoned.

(51) Int. Cl.
| H04N 7/173 | (2011.01) |
| H04N 7/18 | (2006.01) |
| H04N 21/231 | (2011.01) |
| H04N 21/6375 | (2011.01) |
| H04N 5/445 | (2011.01) |

(52) U.S. Cl.
CPC ..... *H04N 21/23113* (2013.01); *H04N 21/6375* (2013.01)

(58) Field of Classification Search
CPC .......................... H04N 21/6375; H04N 21/232
USPC ............... 725/32, 34, 35, 36, 110, 89, 50, 97, 725/143, 22, 23, 116–117, 94, 115, 145, 725/146; 707/662, 663; 709/219
See application file for complete search history.

(56) References Cited

U.S. PATENT DOCUMENTS

| 4,724,491 A | | 2/1988 | Lambert |
| 4,814,883 A | | 3/1989 | Perine et al. |
| 4,862,268 A | | 8/1989 | Campbell et al. |
| 5,029,014 A | * | 7/1991 | Lindstrom .................... 386/106 |
| 5,055,924 A | | 10/1991 | Skutta |
| 5,058,096 A | * | 10/1991 | Ando et al. ................. 369/53.21 |
| 5,099,319 A | * | 3/1992 | Esch et al. ...................... 725/36 |
| 5,197,047 A | | 3/1993 | Witheridge et al. |
| 5,216,515 A | | 6/1993 | Steele et al. |
| 5,237,682 A | | 8/1993 | Bendert et al. |
| 5,319,648 A | | 6/1994 | Bux et al. |
| 5,345,594 A | | 9/1994 | Tsuda |
| 5,392,066 A | | 2/1995 | Fisher et al. |
| 5,412,416 A | * | 5/1995 | Nemirofsky .................... 725/36 |
| 5,424,770 A | | 6/1995 | Schmelzer et al. |
| 5,428,732 A | | 6/1995 | Hancock et al. |
| 5,432,542 A | | 7/1995 | Thibadeau et al. |
| 5,442,771 A | | 8/1995 | Filepp et al. |

(Continued)

OTHER PUBLICATIONS

Munson et al., Sync: a Java framework for mobile collaborative applications, Jun. 1997, IEEE, vol. 30, 59-66.

(Continued)

*Primary Examiner* — Pankaj Kumar
*Assistant Examiner* — Reuben M Brown
(74) *Attorney, Agent, or Firm* — Sawyer Law Group, P.C.

(57) ABSTRACT

Aspects for ensuring digital media data delivery from remote sites in a digital media distributor system are presented. The aspects include receiving playout data in the remote sites from a central site in the digital media distributor system. The received playout data is then utilized in the remote site by an inventory manager to direct control of proper playout of digital media data. The playout data includes spot files, playlists, and purge lists.

20 Claims, 3 Drawing Sheets

(56) References Cited

U.S. PATENT DOCUMENTS

| | | | |
|---|---|---|---|
| 5,450,122 A * | 9/1995 | Keene .................. 725/22 |
| 5,463,771 A | 10/1995 | Sotoyanagi et al. |
| 5,485,219 A * | 1/1996 | Woo .................. 348/460 |
| 5,493,677 A | 2/1996 | Balogh et al. |
| 5,495,608 A | 2/1996 | Antoshenkov |
| 5,499,046 A * | 3/1996 | Schiller et al. .............. 725/146 |
| 5,515,098 A | 5/1996 | Carles |
| 5,532,939 A | 7/1996 | Psinakis et al. |
| 5,550,863 A | 8/1996 | Yurt et al. |
| 5,583,561 A | 12/1996 | Baker et al. |
| 5,584,050 A * | 12/1996 | Lyons .................. 455/2.01 |
| 5,594,490 A | 1/1997 | Dawson et al. |
| 5,600,366 A * | 2/1997 | Schulman .................. 725/36 |
| 5,600,573 A | 2/1997 | Hendricks et al. |
| 5,652,613 A * | 7/1997 | Lazarus et al. .............. 725/50 |
| 5,659,351 A | 8/1997 | Huber |
| 5,666,645 A | 9/1997 | Thomas et al. |
| 5,726,909 A | 3/1998 | Krikorian |
| 5,727,002 A | 3/1998 | Miller et al. |
| 5,729,735 A | 3/1998 | Meyering |
| 5,745,756 A * | 4/1998 | Henley .................. 1/1 |
| 5,758,150 A | 5/1998 | Bell et al. |
| 5,758,345 A | 5/1998 | Wang |
| 5,761,432 A | 6/1998 | Bergholm et al. |
| 5,809,235 A | 9/1998 | Sharma et al. |
| 5,826,165 A * | 10/1998 | Echeita et al. .............. 725/22 |
| 5,835,911 A * | 11/1998 | Nakagawa et al. |
| 5,857,181 A | 1/1999 | Augenbraun |
| 5,887,243 A | 3/1999 | Harvey et al. |
| 5,892,535 A * | 4/1999 | Allen et al. .................. 725/36 |
| 5,892,915 A * | 4/1999 | Duso et al. .............. 709/219 |
| 5,907,494 A | 5/1999 | Dangelo et al. |
| 5,913,039 A | 6/1999 | Nakamura et al. |
| 5,920,700 A * | 7/1999 | Gordon et al. .............. 709/226 |
| 5,956,716 A * | 9/1999 | Kenner et al. .............. 725/143 |
| 5,960,406 A | 9/1999 | Rasansky et al. |
| 5,990,884 A | 11/1999 | Douma et al. |
| 5,990,927 A | 11/1999 | Hendricks et al. |
| 5,996,025 A | 11/1999 | Day et al. |
| 6,005,534 A | 12/1999 | Hylin et al. |
| 6,011,758 A | 1/2000 | Dockes et al. |
| 6,029,045 A * | 2/2000 | Picco et al. .................. 725/34 |
| 6,034,678 A | 3/2000 | Hoarty et al. |
| 6,035,323 A | 3/2000 | Narayen et al. |
| 6,044,381 A | 3/2000 | Boothby et al. |
| 6,058,422 A | 5/2000 | Ayanoglu |
| 6,061,683 A | 5/2000 | Alonso |
| 6,084,856 A * | 7/2000 | Simmons et al. .............. 370/235 |
| 6,088,796 A | 7/2000 | Cianfrocca et al. |
| 6,094,680 A * | 7/2000 | Hokanson .................. 709/223 |
| 6,144,999 A | 11/2000 | Khalidi et al. |
| 6,151,598 A | 11/2000 | Shaw et al. |
| 6,170,005 B1 | 1/2001 | Meandzija |
| 6,185,573 B1 | 2/2001 | Angelucci et al. |
| 6,192,363 B1 | 2/2001 | Yasumura |
| 6,192,410 B1 | 2/2001 | Miller et al. |
| 6,212,560 B1 | 4/2001 | Fairchild |
| 6,222,530 B1 | 4/2001 | Sequeira |
| 6,253,079 B1 | 6/2001 | Valentine et al. |
| 6,256,673 B1 | 7/2001 | Gayman |
| 6,279,157 B1 * | 8/2001 | Takasu .................. 725/22 |
| 6,298,385 B1 | 10/2001 | Sparks et al. |
| 6,330,572 B1 * | 12/2001 | Sitka .................. 707/608 |
| 6,330,613 B1 | 12/2001 | Vlajnic et al. |
| 6,336,115 B1 | 1/2002 | Tominaga et al. |
| 6,353,831 B1 | 3/2002 | Gustman |
| 6,370,550 B1 | 4/2002 | Douma et al. |
| 6,378,036 B2 | 4/2002 | Lerman et al. |
| 6,378,129 B1 * | 4/2002 | Zetts .................. 725/94 |
| 6,385,596 B1 | 5/2002 | Wiser et al. |
| 6,405,317 B1 | 6/2002 | Flenley et al. |
| 6,411,685 B1 | 6/2002 | O'Neal |
| 6,412,009 B1 | 6/2002 | Erickson et al. |
| 6,434,621 B1 * | 8/2002 | Pezzillo et al. .............. 709/231 |
| 6,434,680 B2 | 8/2002 | Belknap et al. |
| 6,438,125 B1 | 8/2002 | Brothers |
| 6,441,832 B1 * | 8/2002 | Tao et al. .................. 715/723 |
| 6,446,108 B1 | 9/2002 | Rosenberg et al. |
| 6,463,585 B1 | 10/2002 | Hendricks et al. |
| 6,466,734 B2 | 10/2002 | Yuen et al. |
| 6,473,902 B1 * | 10/2002 | Noritomi .................. 725/91 |
| 6,487,721 B1 * | 11/2002 | Safadi .................. 725/36 |
| 6,510,558 B1 * | 1/2003 | Iinuma et al. .............. 725/113 |
| 6,513,069 B1 | 1/2003 | Abato et al. |
| 6,526,575 B1 | 2/2003 | McCoy et al. |
| 6,535,878 B1 | 3/2003 | Guedalia et al. |
| 6,571,391 B1 | 5/2003 | Acharya et al. |
| 6,581,076 B1 | 6/2003 | Ching et al. |
| 6,647,417 B1 | 11/2003 | Hunter et al. |
| 6,687,737 B2 | 2/2004 | Landsman et al. |
| 6,698,020 B1 | 2/2004 | Zigmond et al. |
| 6,718,425 B1 | 4/2004 | Pajakowski et al. |
| 6,763,523 B1 * | 7/2004 | Sacilotto et al. .............. 725/91 |
| 6,792,615 B1 | 9/2004 | Rowe et al. |
| 6,799,326 B2 | 9/2004 | Boylan et al. |
| 6,810,527 B1 | 10/2004 | Conrad et al. |
| 7,024,681 B1 * | 4/2006 | Fransman et al. .............. 725/115 |
| 7,039,930 B1 * | 5/2006 | Goodman et al. .............. 725/22 |
| 7,260,785 B2 | 8/2007 | Ching et al. |
| 2002/0004936 A1 | 1/2002 | Aras |
| 2002/0016831 A1 | 2/2002 | Peled et al. |
| 2002/0077984 A1 | 6/2002 | Ireton |
| 2002/0092019 A1 | 7/2002 | Marcus |
| 2003/0033424 A1 * | 2/2003 | Gould .................. 709/233 |
| 2003/0189649 A1 * | 10/2003 | Kuno .................. 348/211.1 |
| 2004/0210932 A1 * | 10/2004 | Mori et al. .................. 725/39 |
| 2008/0059997 A1 | 3/2008 | Plotnick et al. |

OTHER PUBLICATIONS

Kshemkalyani., Synchronization for distributed real-time applications, Apr. 1-3, 1997, IEEE, 81-90.

IBM Technical Disclosure Bulletin—"Task Scheduling", vol. 21, issue 5, pp. 1809-1810, published Oct. 1, 1978 (IBM).

* cited by examiner

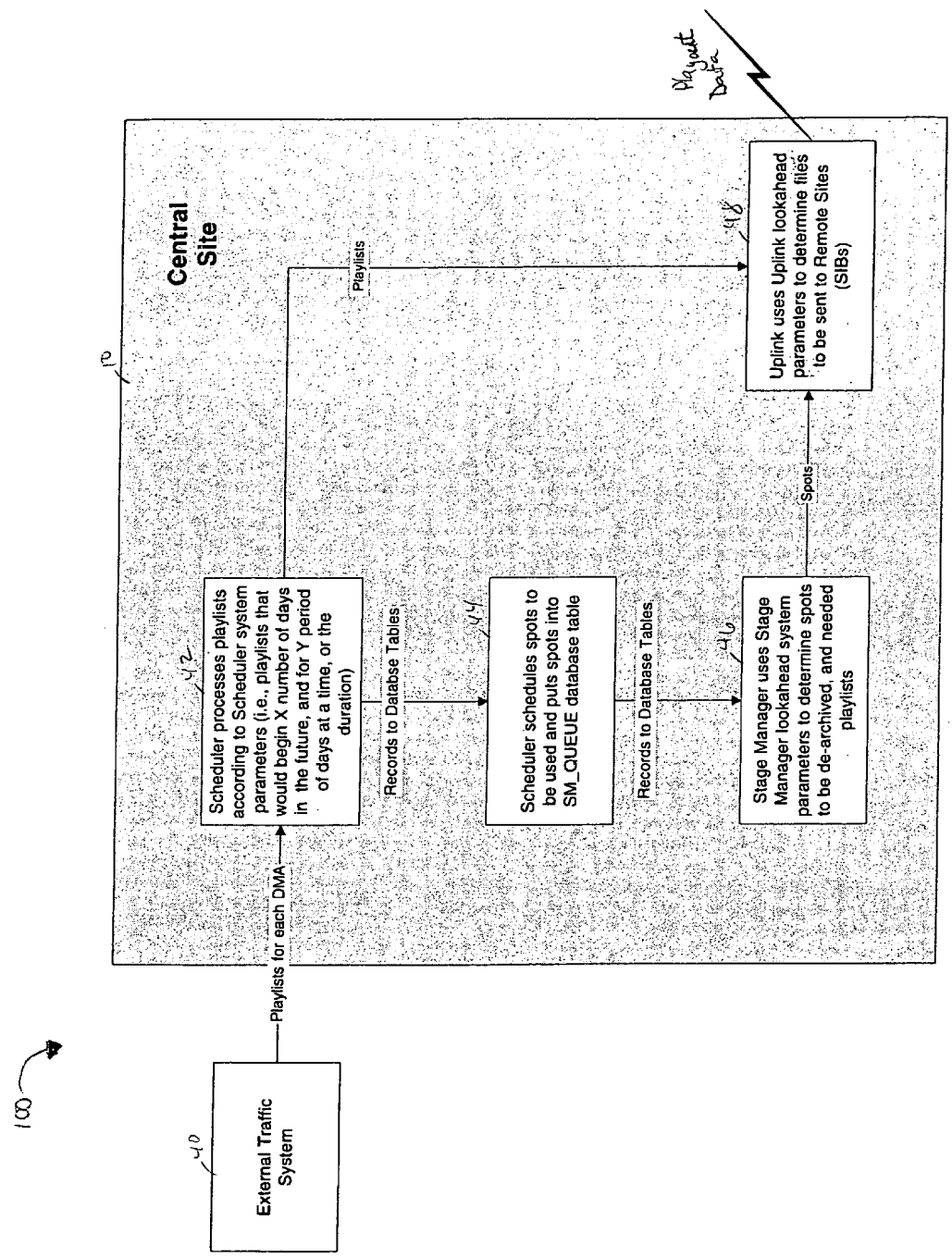

METHOD FOR ENSURING RELIABLE PLAYOUT IN A DMD SYSTEM

RELATED APPLICATIONS

The present invention is related to co-pending U.S. Application, entitled MULTIMEDIA INFORMATION COMPUTER SYSTEM AND METHOD OF OPERATION OF A PLAYLIST SCHEDULER, Ser. No. 09/420,802, filed on Oct. 19, 1999, and assigned to the assignee of the present invention.

FIELD OF THE INVENTION

The present invention relates to digital media distribution, and more particularly to ensuring reliable playout through use of inventory management in a remote site of a digital media distributor system.

BACKGROUND OF THE INVENTION

Although broadcasters have sophisticated systems for inserting national commercials into a program stream, including integrated traffic and billing systems, there are numerous obstacles to implementing a system to insert local commercials at small markets into a national program feed distributed by satellite. Until now, such local spot insertion advertising was the responsibility of the local broadcaster or cable operator.

Inserting local advertising poses several nontrivial technical, logistical and business challenges. First, literally hundreds of widely distributed local operators (or affiliates) would need to receive the commercials; ad agencies would have to ship analog tapes to hundreds of organizations, with different traffic and billing systems. These tapes would need to be tested for quality assurance, tracked, and stored until needed. They would then have to be distributed to video tape recorders and readied for computer controlled playout (analog) at the proper time, 24 hours a day, seven days a week. Such infrastructure generally exists at well-funded affiliates in major markets but is nonexistent and prohibitively expensive for smaller operators or affiliates in small markets.

Managing such tapes with ads for local commercials and inserting them properly into the program feed is a complex undertaking not well-suited for the smaller operators, especially for channels with smaller audiences in smaller markets. A quality broadcast involves more than excellent program material; it must provide seamless insertion of national and local advertisements, promotions, and station identifications.

Equally important is the ability to maintain the integrity of the national television programming. Centralized control of the channel's programming (playout) is required to prevent local affiliates from tampering with the programming.

Accordingly, a need exists for an efficient system for reliable playout including inventory management in a remote site of a digital media distributor system. The present invention addresses such a need.

SUMMARY OF THE INVENTION

Aspects for ensuring digital media data delivery from remote sites in a digital media distributor system are presented. The aspects include receiving of playout data in the remote sites from a central site in the digital media distributor system. The received playout data is then utilized in the remote site by an inventory manager to direct control of proper playout of digital media data. The playout data includes spot files, playlists, and purge lists.

Through the aspects of the present invention, modules of a remote site provide the ability to efficiently manage digital media data for playout from the remote site. Particularly, through the implementation of an inventory manager in accordance with the present invention, streamlined management of playout data ensures accurate delivery of digital spots to the end-users. Included in the management is a look-ahead functionality that allows spots that are not yet present but are needed soon to be identified and transmitted in time for a scheduled delivery, thus ensuring integrity in spot playout. These and other advantages of the aspects of the present invention will be more fully understood in conjunction with the following detailed description and accompanying drawings.

BRIEF DESCRIPTION OF THE DRAWINGS

FIG. 4 illustrates a block diagram of a central site transmission process of the playout process of FIG. 3.

DETAILED DESCRIPTION

The present invention relates to reliable playout of digital media data by a remote site in a digital media distributor system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a digital media distributor (DMD) provides a complete end-to-end system that gives local cable or network affiliates the ability to provide local ads and announcement insertion together with the delivery of cable or network feed(s). In general, the DMD integrates the entire process of sales, traffic, digital encoding and storage of spots, transmission of data, local insertion of digital ads and announcements, account reconciliation, and billing. Spots (i.e., media such as commercials, station identification, public service announcements, etc.) are digitized by the cable or network operator, and then digitally transmitted to the local cable head-ends or network affiliates from a central site. These digital spots are then stored on the remote site servers located at each head-end or affiliate.

Figure 1:
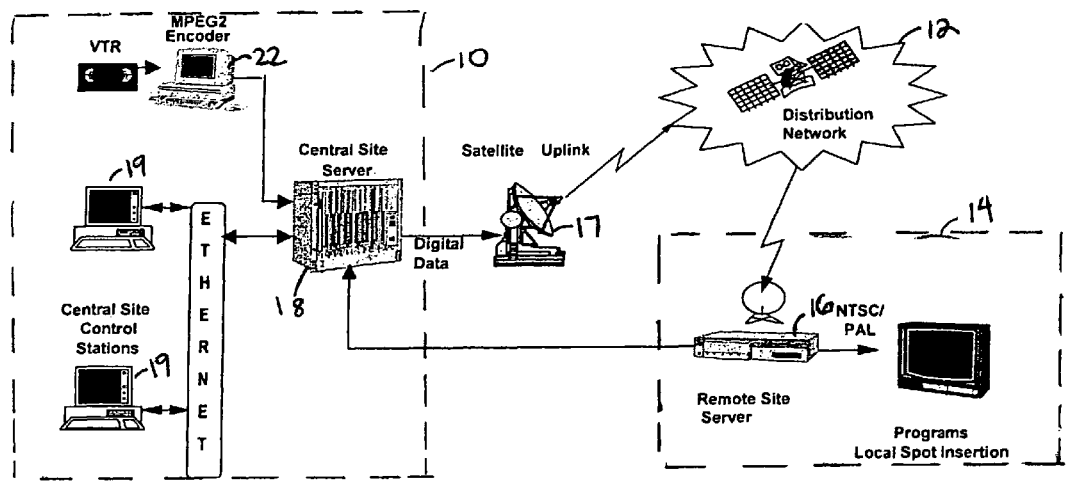
FIG. 1 illustrates a block diagram of a digital media distribution system in accordance with the present invention.

A block diagram of a DMD in accordance with the present invention is illustrated in FIG. 1. As shown, the DMD includes three major components: a central site 10, a distribution network 12, and a remote site 14. The central site 10 is the location for the digital encoding of MPEG-2 files from source video tapes, storage and management of digital files, management of remote site(s) 14, and distribution of schedules and MPEG-2 files. Thus, the processing, analysis, distribution, and management of data occurs at the central site 10.

The distribution network 12 is the mechanism by which the remote site(s) 14 receive program streams and digital spots. The data distribution is accomplished via various methods, such as a satellite and/or land-based distribution. The broadcaster may choose to have the program stream sent via terrestrial links (e.g., token ring, ethernet, etc.), while the spot insertion is sent via satellites or vice versa.

The remote site(s) 14 house the remote site server(s) 16. By way of example, a suitable remote site server 16 includes a Pentium processor-based device with a hard disk for local storage and a video switch card (to switch between program and commercial insertion) running software including Windows NT, DMD programming, Lotus Notes client, Program Loader, and Symantec pcANYWHERE. These unattended, computerized systems receive the local insertion and provide As-Run file generation. The remote site server 16 is a video server that receives and stores digitized spots utilized for local insertion at the cable head-end. The remote site server 16 receives digitally encoded ads via satellite or other distribution network. These spots are decoded to an analog signal and inserted into the cable or network operator feed at scheduled times, i.e., into scheduled local availability times. The remote site server 16 can be customized in various configurations based on the number of output channels required, the type of output format (e.g., NTSC, PAL), the amount of local storage required (i.e., the number of spots on disk), the type of network (satellite or terrestrial), the type of trigger for spot insertion (e.g., time of day, VITC, cue-tome, VBI trigger), the audio format and connections (stereo, mini-XLR or XLR), the redundancy requirements (RAID, mirrored disks), and the preview channel.

By way of example, the following provides a sample process that illustrates an example of one process which the DMD solution can support. A region, e.g., any grouping of one ore many cable head-ends for cities, states, provinces, or countries, defined by cable or network operators in an area, sells a commercial in the local availability time. All remote site servers 16 within the same region play the same material at the same time, including all network programs, national spots, local commercials, announcements, etc. The videotaped segment for the commercial is digitally encoded. The digital material is scheduled for delivery to each remote site server 16 prior to broadcast. The playlist, digitized spots, and the broadcast program stream are sent, via satellite, to all of the remote site servers 16 within the region. All of the remote site servers 16 within the region air the local spots for that region at the scheduled time. As-Run logs are retrieved by the central site 10 from the remote site servers 16. As-Run logs are sent to the local markets, reviewed, reconciled, and customers are billed. Commercials and As-Run logs are then archived.

The central site 10 efficiently distributes objects and thus manages the resources of the remote site 14. By managing these resources, the central site 10 can determine when to send information to the remote site(s) 14. A main component in producing the management of the resources is the central site server 18. By way of example, a suitable central site server 18 includes an IBM RS/6000 F50 dual CPU system, or a Pentium II compatible PC, running the IBM UNIX operating system, AIX, DB2 server software, Lotus Notes server software, ADSM, Windows NT (for PC-based central site server), and the DMD programming. Suitable components for the control workstations 19 include Pentium compatible PCs running Windows NT, Lotus Notes client, DB2 client, Microsoft Internet Explorer, and DMD programming.

Figure 2:
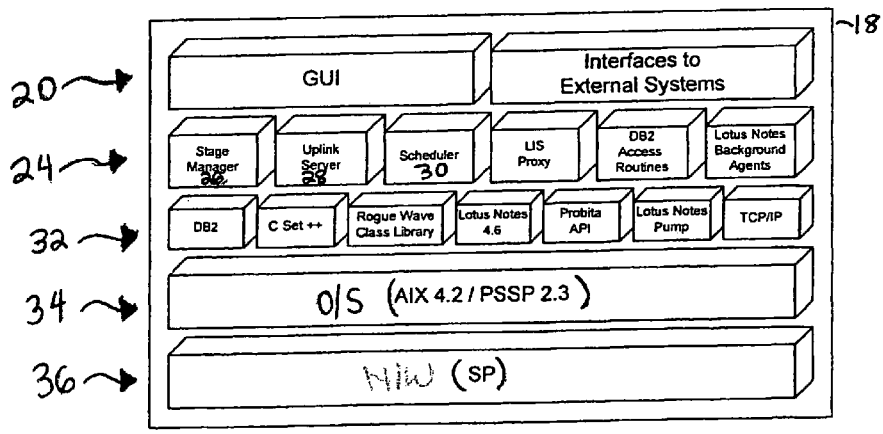
FIG. 2 illustrates an example of a suitable layered architecture for the central site server.

The central site server 18 includes software on a suitable computer readable medium that is architected using a layered model, in which each layer isolates the upper layers from the details of the lower layers and individual components within a layer provide a unique set of services, as is well appreciated by those skilled in the art. FIG. 2 illustrates an example of a suitable layered architecture for the central site server 18. The top layer 20 addresses the external interfaces of the central site server 18, including a graphical user interface (GUI) component and the interfaces to the external systems. The GUI component, e.g., using Lotus Notes, provides administrators and operators with the ability to monitor and control the DMD. The interfaces to external systems include interfaces to traffic systems, which interface to the central site 18 by way of files exchanged on an Internet file server, for example, interfaces to stations in a box (SIBs) which send Lotus Notes messages, and interfaces to encoder systems (22, FIG. 1), which store encoded spot files in a disk pool server for retrieval by the central site server 18.

Underneath the top layer is a layer 24 of specialized components including a stage manager component 26, an uplink server component 28, and a transmission scheduler component 30. This layer 24 may also include specialized components for creating commands and interpreting responses from SIBs, managing access to all the database queues and other data stores, and providing automated agents that run based on time or events to manage the external interfaces, e.g., processing files received from traffic systems. The stage manager 26 manages any tape related activity, the uplink server 28 manages transmissions through the uplink network (12, FIG. 1), and the transmission scheduler manages scheduling tasks. Also included as a next layer is a programming layer 32. The layer 32 includes the programming libraries and APIs (application programming interfaces) that are used to build the specialized components. The lower two layers include an operating system layer 34 and a hardware layer 36 for the fundamental operation of the central site server 18, as is well appreciated by those skilled in the art.

Figure 5:
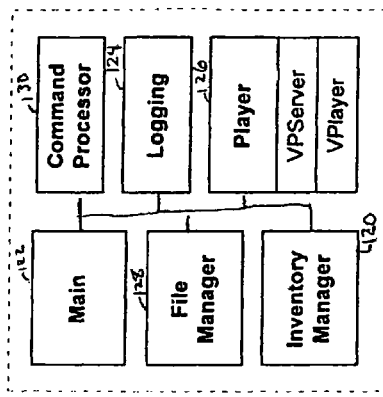
FIG. 5 illustrates a component block diagram, including an inventory manager, for a remote site in accordance with the present invention.
Figure 3:
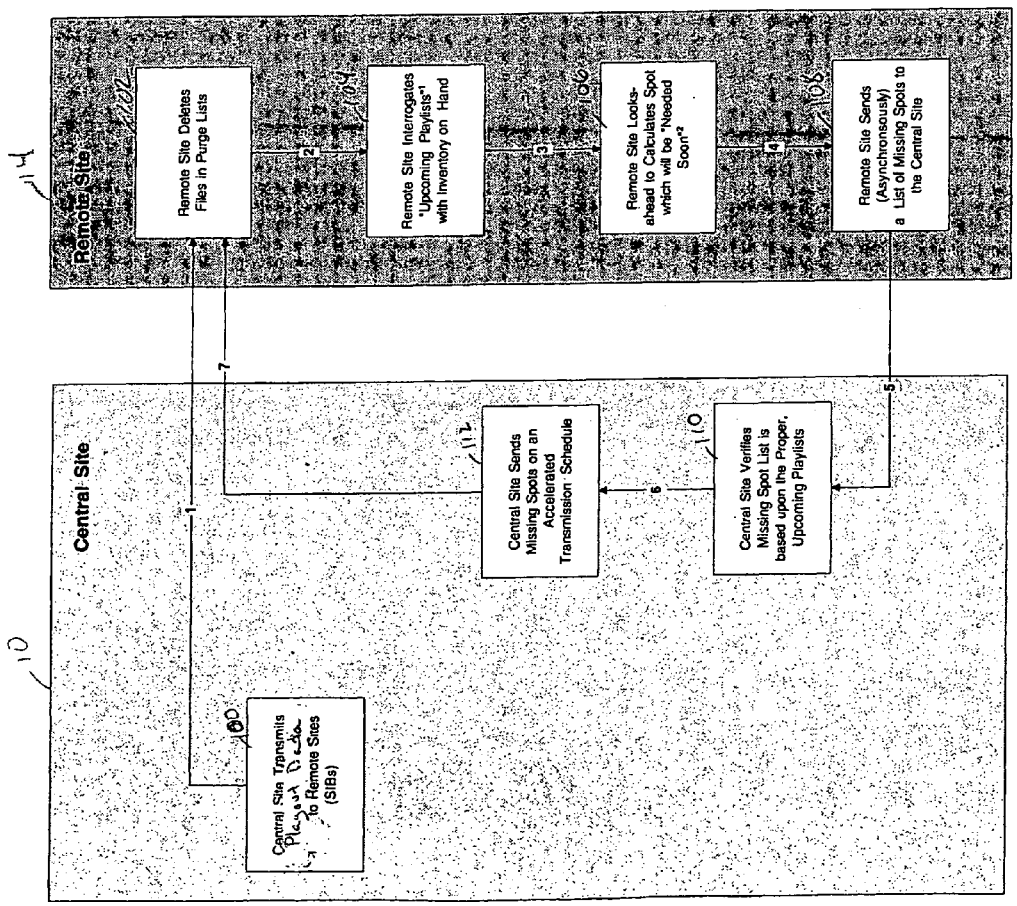
FIG. 3 illustrates a block diagram of a reliable spot playout process in accordance with the present invention.

In accordance with the present invention, remote sites 14 ensure reliable playout of the spots as scheduled through the utilization of an inventory manager, as described with reference to FIGS. 3, 4, and 5. Referring to FIG. 3, the playout of the spots initiates with the central site 10 transmitting playout data, the playout data including spots, playlists, and purge lists, to the remote site (SIBS) 14 (step 100).

FIG. 4 illustrates a block diagram of the processes of step 100 in the central site 10 that occur in order to provide the playout data to the remote site 14. The central site 10 receives the playlists for each DMA (i.e., the group or unit in the local area that will receive and broadcast program material and perform ad insertion) from an external source/traffic system 40. The transmission scheduler 30 (FIG. 2) processes playlists (step 42) according to transmission scheduler system parameters (e.g., playlists that would begin X number of days in the future, and for Y period of days at a time, or the duration). Playlists are then transferred to the uplink server component 28 (FIG. 2), while appropriate records are saved in the database tables. The transmission scheduler 30 schedules the spots to be used and puts the spots into the stage manager queue database table (step 44), which results in the records being saved in the appropriate database tables. The stage manager component 26 (FIG. 2) uses stage manager lookahead system parameters to determine spots to be dearchived, and needed playlists (step 46), which results in the spots being transferred to the uplink server component 28. The uplink server component 28 uses uplink lookahead parameters to determine files to be sent to remote sites (SIBs) 14 as playout data (step 48).

Referring again to FIG. 3, once the playout data has been transmitted to the remote site 14, the remote site utilizes the playout data to manage inventory and ensure proper delivery of spots on-time. Thus, the remote site 14: deletes files in purge lists of the playout data (step 102), interrogates "Upcoming Playlists" (defined by a system parameter "SCHED_LOOKAHEAD") with inventory on hand (step 104); looks-ahead to identify spot(s) which will be "needed soon" (defined by a system parameter "SIB_MISSINGSPOTWINDOW") (step 106); and sends (asynchronously) a list of missing spots to the central site 10 (step 108). The central site 10 then verifies that the missing spot list is based upon the proper, upcoming playlists (step 110) and sends missing spots on an accelerated transmission schedule to the remote site 14 (step 112).

The system parameter "SCHED_LOOKAHEAD" refers to a scheduler parameter that indicates the number of days from the current date for which the transmission scheduler 130 (FIG. 2) attempts to begin playlist processing. For example, if set to 1, the playlists from the next day on through the "SCHED_LOOKAHEAD_DUR" (up to five days beyond the next day) will be processed, if available, where "SCHED_LOOKAHEAD_DUR" refers to a transmission scheduler 130 parameter that indicates the number of days of playlists that the scheduler will attempt to process at a time. The "SIB_MISSINGSPOTWINDOW" parameter refers to a remote site parameter that sets the missing spot look-ahead window, e.g., in hours, so that the remote site 14 will look-ahead X hours in the playlist as defined in "SIB_MISSINGSPOTWINDOW", and report the missing spots.

In performing the management of inventory, the remote site utilizes an inventory manager module. As shown in FIG. 5, an inventory manager module 120 is a sub-thread of a main module 122 of a main program of the remote site 14. The main program is responsible for the start up of the remote site/SIB box. The process starts up a separate module called the main module 122, which is responsible for initialization and starting the other program threads.

When the main module 122 receives the initialization message, it creates and initializes all of the other modules/threads of the system, including an inventory manager module 120, logging module 124, player module 126, file manager module 128, and command processor module 130. The logging module 124 is responsible for maintaining a record of internal events and logs informational, warning, and error messages to a remote site 14 log file or sends the messages asynchronously to the central site 10, as determined by the severity of the message and the reporting and logging levels set by the central site 10.

The player module 126 plays spots as specified in the playlist and generates As-Run files after playing. The player module 126 handles one playlist at a time and provides a device independent interface for use by a player server. The player module 126 is organized into interacting objects: a playlist object that manages the playlist by cueing up spot files (e.g., files with an ".mpg" extension) and setting starts and durations; a player server object that executes the playlist by playing spots (i.e., decoding and generating NTSC video out); and an As-Run object that tracks actual playtimes and generates the As-Run list for all playlists, notifying the file manager 128 to send the as-run lists back to the central site 10.

The file manager 128 is responsible for receiving the satellite feed and managing files. Thus, the file manager 128 identifies when new files arrive and moves them to the proper directories (e.g., makes a secure file copy and examines the file type(s)). The file manager 128 also notifies any affected modules about the new files, i.e., when a spot or playlist arrives, it notifies the inventory manager 120, and when a command file arrives, it notifies the command processor 130.

The command processor 130 is responsible for executing central site 10 commands to send status, execute commands, use new playlist(s), use new MPEG spots, etc. When a new command (e.g., a file with a ".cmd" extension) is received, the command processor 130 reads and parses command file(s) to then execute the command(s) or post messages, so that the affected modules can execute the new command(s). Thus, MPEG file commands are delegated to the inventory manager 120, all other file commands are delegated to the file manager 128, player commands, if implemented, are delegated to player 126, and "set parameter" commands are implemented by the command processor 130.

The inventory manager 120 is responsible for maintaining spot information and for implementing MPEG file commands, missing spot lists, and the spot purging algorithm, to ensure reliable spot playout in accordance with the present invention. The information that is maintained includes the names of all spots that reside on the MPEG disk drive(s), regardless of whether the spot is needed by any playlist. If the spot is needed by one or more playlists, the playlist name(s) and scheduled start time(s) are also maintained for the spot. Through this information, the inventory manager 120 knows which spots are missing and when they are needed. Likewise, it knows which spots are not needed, thereby also providing the remote site 14 spot purging algorithm. The inventory manager 120 also coordinates the deletion of all spots, since it maintains the delete protect flag for each spot. The delete protection is a condition for the spot that the central site can set 10, which prevents the spot from being deleted via central site 10 delete command or the purging algorithm unless the delete protection is first removed by a central site 10 command. While coordination of spot deletion is done by inventory manager 120, the actual physical deletion of spots is performed by the file manager 128. The inventory manager 120 performs parsing of new or updated playlists to detect playlist corruption and to detect if reload commands are present in updated playlists.

The following summarizes functions performed by the inventory manager 120:

Provides deletion of spot files upon request by sending a delete message to the file manager 130.

Provides the high watermark deletion algorithm (purging) of spot files to bring the disk usage down to the low watermark, as initiated and driven by the file manager 130.

Maintains information on needed spot files based upon the contents of all playlists.

Maintains information on spot files that exist on the Remote Site disk drive(s).

Generates the list of (1) missing spots and (2) purged spots upon request or at the prescribed time based upon configurable parameters.

For updated playlists received for the current day, checks for reload commands and causes the reload of the updated playlist based upon the reload command or default behavior (when no reload command is present in the updated playlist).

The inventory manager 120 interfaces with/is dependent on other threads as follows:

Is dependent on main module 122 to start and initialize its module and to provide the module IDs (identifiers) of the threads to which the inventory manager 120 sends messages. Inventory manager 120 is also dependent on main 122 to shut it down or reboot.

Interfaces with the file manager 128 for the following reasons:
- file manager 128 notifies the inventory manager 120 of all existing spots and playlists upon initialization and when inventory manager 120 asks for the information.
- file manager 128 notifies the inventory manager 120 when each new spot file arrives on disk.
- file manager 128 notifies the inventory manager 120 when each new playlist file arrives on disk.
- file manager 128 deletes spots upon request from the inventory manager 120.
- file manager 128 deletes playlists upon request from the inventory manager 120.
- file manager 128 notifies the inventory manager 120 when the high watermark has been exceeded on the MPEG drive(s) and drives the purging process.
- file manager 128 notifies the inventory manager 120 with the results of the spot or playlist delete requests.

Is dependent on the player module 126 to notify it to delete a corrupted spot detected during playback. Inventory manager 120 interfaces with the player module 126 to reload the new playlist when a new playlist is received for the current day.

Is dependent on command processor 130 to send messages for (1) processing commands, and (2) kicking off the periodic reports for list of missing spots and list of purged spots. Inventory manager 120 interfaces with the command processor 130 to provide response data when a supported command requires a response from the central site 10.

The ability to efficiently manage digital media data for playout from a remote site is achieved through the implementation of an inventory manager in accordance with the present invention. The inventory manager provides streamlined management of playout data to ensure accurate delivery of digital spots to the end-users. Included in the management is a look-ahead functionality that allows spots that are not yet present but are needed soon to be identified and transmitted in time for a scheduled delivery, thus ensuring integrity in spot playout.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer-implemented method, comprising:
   receiving playout data at a remote site from a central site in a digital media distributor system, wherein the playout data includes at least one playlist;
   responsive to a determination that a spot file within the at least one playlist is missing at the remote site using a look-ahead mechanism, receiving the missing spot file from the central site, wherein the look-ahead mechanism includes a remote site parameter that sets a look-ahead window to identify at least one spot file which will be needed;
   broadcasting at least one spot file within the at least one playlist from the remote site; and
   generating an as-run log of the at least one spot file.

2. The method of claim 1, wherein the playout data further includes a purge list.

3. The method of claim 2, further comprising:
   deleting at least one spot file within the purge list at the remote site in accordance with a delete product flag set by the central site.

4. The method of claim 3, wherein the deleting is based on a high watermark deletion algorithm.

5. The method of claim 4, wherein the high watermark deletion algorithm reduces disk usage down to a low watermark.

6. The method of claim 1, wherein the at least one playlist specifies a time each of the at least one spot file is broadcasted.

7. The method of claim 1, wherein the look-ahead mechanism includes a transmission scheduler parameter that indicates a number of playlists to process.

8. The method of claim 1, further comprising:
   requesting the missing spot file from the central site.

9. The method of claim 1, wherein the spot file is any of a commercial, an advertisement, a station identification, a promotion, and a public service announcement.

10. The method of claim 1, further comprising:
    transmitting the as-run log to the central site for billing at least one customer that requested the broadcasting of the at least one spot file.

11. A system, comprising a processor, a memory device coupled to the processor, and an application coupled to the memory device, wherein when executed by the processor, the application provides instructions for:
    receiving playout data at a remote site from a central site in a digital media distributor system, wherein the playout data includes at least one playlist;
    responsive to a determination that a spot file within the at least one playlist is missing at the remote site using a look-ahead mechanism, receiving the missing spot file from the central site, wherein the look-ahead mechanism includes a remote site parameter that sets a look-ahead window to identify at least one spot file which will be needed;
    broadcasting at least one spot file within the at least one playlist from the remote site; and
    generating an as-run log of the at least one spot file.

12. The system of claim 11, wherein the playout data further includes a purge list.

13. The system of claim 12, wherein the application further provides instructions for:
    deleting at least one spot file within the purge list at the remote site in accordance with a delete product flag set by the central site.

14. The system of claim 13, wherein the deleting is based on a high watermark deletion algorithm.

15. The system of claim 11, wherein the at least one playlist specifies a time each of the at least one spot file is broadcasted.

16. The system of claim 11, wherein the look-ahead mechanism includes a transmission scheduler parameter that indicates a number of playlists to process.

17. The system of claim 11, wherein the application further provides instructions for:
    requesting the missing spot file from the central site.

18. The system of claim 11, wherein the spot file is any of a commercial, an advertisement, a station identification, a promotion, and a public service announcement.

19. The system of claim 11, wherein the application further provides instructions for:
    transmitting the as-run log to the central site for billing at least one customer that requested the broadcasting of the at least one spot file.

20. A non-transitory computer-readable medium encoded with a computer program, the computer program comprising computer-executable instructions for:
- receiving playout data at a remote site from a central site in a digital media distributor system, wherein the playout data includes at least one playlist;
- responsive to a determination that a spot file within the at least one playlist is missing at the remote site using a look-ahead mechanism, receiving the missing spot file from the central site, wherein the look-ahead mechanism includes a remote site parameter that sets a look-ahead window to identify at least one spot file which will be needed;
- broadcasting at least one spot file within the at least one playlist from the remote site; and
- generating an as-run log of the at least one spot file.

* * * * *